INVENTOR
GOLDEN C. DAVIS
BY
Marechal, Biebel, French & Bugg
ATTORNEYS 3,374,041
Patented Mar. 19, 1968

3,374,041

CARRIER FOR DISK RECORDS

Golden C. Davis, 420 S. Spring St., Springfield, Ohio 45505

Filed May 10, 1967, Ser. No. 637,418
11 Claims. (Cl. 312—10)

ABSTRACT OF THE DISCLOSURE

A case for protecting, preserving, storing and transporting disk records, formed with mating case members hinged together and incorporating collapsible spring means carried by one case member and extending towards the other case member for maintaining the records in flat stacked relation when the case is closed to prevent warping of the records, and for supporting the records in a conveniently accessible position when the case is open.

*Background of the invention*

Cases for carrying and storing disk records to protect and preserve them commonly employ a box with mating case members hinged and latched together in a manner similar to a small suitcase or attaché case. Such cases are usually adapted to receive the records in one of two ways. One is with the records in horizontal positions and arranged in stacked relation. In this form of case, each face of each record must bear the weight of all the records above it, which continually increases as more records are added. The constant weight or pressure on a record at or near the bottom of the stack from the records above it may damage the sensitive and delicate grooved surface of the record. Moreover, if it is desired to remove a record which is at or near the bottom of the stack, all those above it must first be removed from the case.

The other form of case is adapted to receive the records in an upright or vertical position, with each record resting upon its edge and bearing its own weight. Unless and until the case is substantially filled, however, the records will ordinarily fall into a slanting position, with the possibility that they will become warped unless provided with a lateral support.

Such lateral support has been provided in the prior art, either by incorporating means forming a series of compartments for receiving the records individually, as illustrated in Patent No. 2,261,806, or by some form of clamping device for retaining the records in fixed position in the case, such as is exemplified by Patent No. 1,320,958.

A case construction employing a series of divider members defining compartments for the records significantly increases the cost of the case, and substantially reduces its capacity or increases its size, because the divider members take up space themselves, and leave open areas between adjacent records. Additionally they fail to provide support for the records unless the case is filled to capacity. Use of a clamping device such as shown in Patent No. 1,320,958, on the other hand, not only substantially limits the record capacity of the case but requires manipulation of the device after the case is opened for removing and adding records and may also employ loose pieces which can easily be forgotten, mislaid or lost.

*Summary of the invention*

The present invention is directed to an improved case for storing and transporting disk records, which is not only economical in construction, but will maintain the records in flat stacked vertical relationship to prevent warping of the records irrespective of whether the case contains only one or two records or is filled to capacity.

In addition, the invention provides for cushioning the records when the case is opened so that they are not subject to the shock of dropping sharply, and supports them in a convenient position for selecting individual records from its contents without removing or disturbing others.

The case of the invention has the further advantage that by reason of the firm support provided, the user has the option of discontinuing use of the heavy cardboard protective cover in which the larger size records are ordinarily sold, on either a temporary basis as during a trip, for example, or permanently leaving only the thin paper or transparent plastic protective envelope in which the record is customarily delivered. In this manner, the number of records which may be stored in the case may be increased substantially.

The above features are accomplished in a preferred embodiment by providing a case including mating case members which form parallel spaced side panels and incorporates at least one conical helical spring connected to one panel for holding the records firmly against the other panel when the case members are closed and for positioning the records for convenient access when the case is open. The case also incorporates a simplified latch means which automatically and positively locks the case members together when the case is closed, and lifted and carried by a handle attached thereto.

Other features and advantages of the invention will be apparent from the following description, the accompanying drawings and the appended claims.

*Description of the preferred embodiments*

Figure 1:
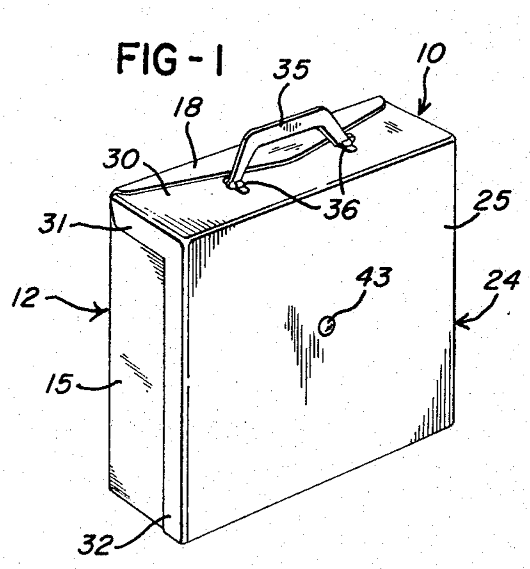
FIG. 1 is a perspective view of a closed record case constructed in accordance with the invention.
Figure 2:
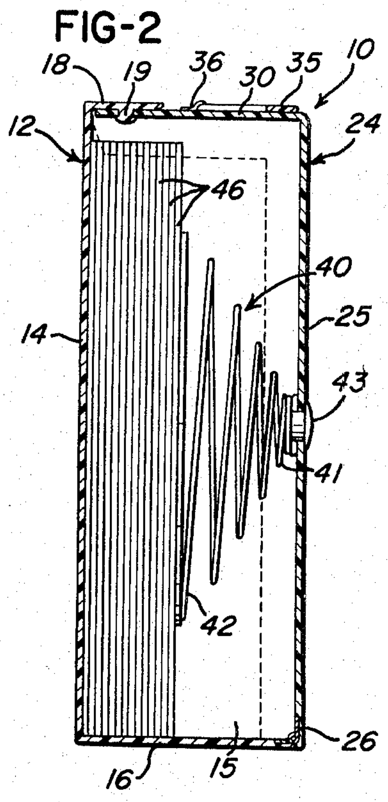
FIG. 2 is a vertical section of a portion of the case shown in FIG. 1 and showing the case approximately half full of records.
Figures 3, 4:
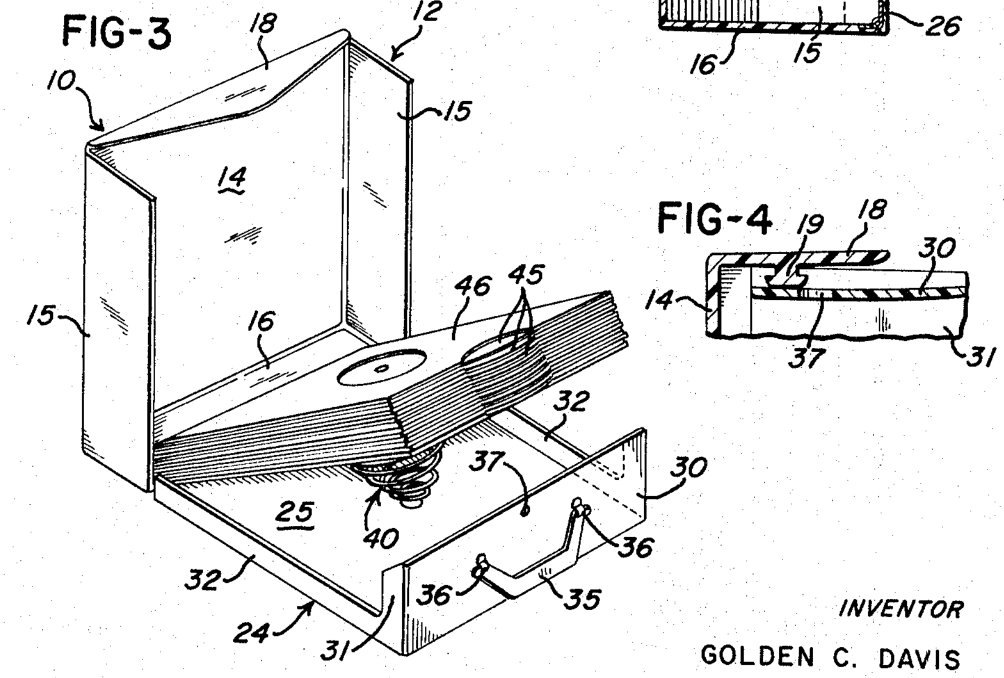
FIG. 3 is a perspective view of the case of FIGS. 1 and 2 in the open position for illustrating conveniently accessible position of the records therein.
FIG. 4 is an enlarged fragmentary section of a latch of a case constructed in accordance with the invention and with the case in a position of being closed.

Referring to the drawings, FIGS. 1–3 shows a case 10 formed substantially of a semi-rigid material such as light metal or plastic, and including a first case member 12 having a flat generally square side panel 14 integrally connected to parallel spaced rectangular end panels 15 and a rectangular bottom panel 16. A triangular shaped tab member 18 extends from the upper edge of the side panel 14 parallel to the bottom panel 16 and includes a stud 19 (FIGS. 2 and 4) projecting downwardly from its underneath surface.

The case 10 also includes a second case member 24 having a flat generally square side panel 25 with a lower edge portion connected to the bottom panel 16 by an elongated hinge 26. While the hinge 26 is shown of metal construction, it is to be understood that the hinge may be formed of plastic as an integral part of one or both of the case members 12 and 24 and thus be in the form commonly referred to as a "living hinge," or of other convenient form well known in the art. A rectangular top panel 30 is shown as extending from the side panel 25 as an integral part thereof, and includes downwardly extending end flanges 31 integrally connected to corresponding end flanges 32 extending from the side panel 25. A handle 35 is pivotally connected to the top panel 30 by brackets 36 and a hole 37 is formed centrally within the projecting edge portion of the top panel 30.

When the case is in a closed position (FIG. 1) the end panels 15 of the case member 12 interfit between the end flanges 31 and 32 of the case member 25 and the top panel 30 extends under the tab member 18 so that the stud 19 projects into the hole 37 forming a detent relationship. For opening the case, the top panel 30 is depressed slightly for releasing the stud 19 from the hole 37 as shown in FIG. 4.

Flanges 31 and 32 on case member 25 provide the advantage that they strengthen the construction and are particularly useful in cases adapted to hold larger size records having substantial weight when the case is full. The case could be made, however, with a half-lap joint or with case members 24 and 25 merely abutting each other, particularly in cases for smaller size records in which the weight to be carried would be substantially less.

Referring to FIG. 2, a conical helical compression spring 40, preferably formed from spring wire, and having a small end portion 41 and a substantially larger end portion 42, is mounted centrally on the side panel 25 by a rivet 43 extending through a hole formed within the side panel and connected to the smaller end portion 41 of the spring. Thus when a stack of records 45 enclosed within their corresponding protective coverings 46, are placed on the bottom panel 16, the larger end 42 of the spring 40 engages the center portion of the outermost covering 46 and applies a lateral force when the case is closed which holds the records in vertical flat stacked relationship against the flat side panel 14 when the case is carried by its handle or stored in upright position, as will ordinarily be the case.

Figure 5:
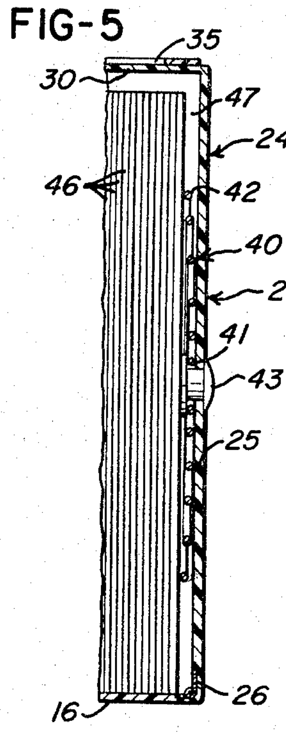
FIG. 5 is a fragmentary section view showing the collapsed position of the spring when a case full of records is closed.

An important feature provided by the conical helical spring 40 is illustrated in FIG. 5. That is, the spring 40 is capable of collapsing into a relatively small space 47 for accommodating a full case of records which substantially fills the space defined between the parallel side panels 14 and 25. In addition, the spring 40 is also capable of extending substantially the full distance between the side panels for retaining, for example, only a few records.

Additional features are that the size of the large end portion 42 of the spring 40 distributes its pressure over a fairly wide area of the record envelope so as to avoid any tendency of the record to bend or warp. Furthermore, when the case is in the open position, the spring 40 supports the stack of records resiliently so as to avoid any sharp blows on them, in a convenient position for handling.

Figure 6:
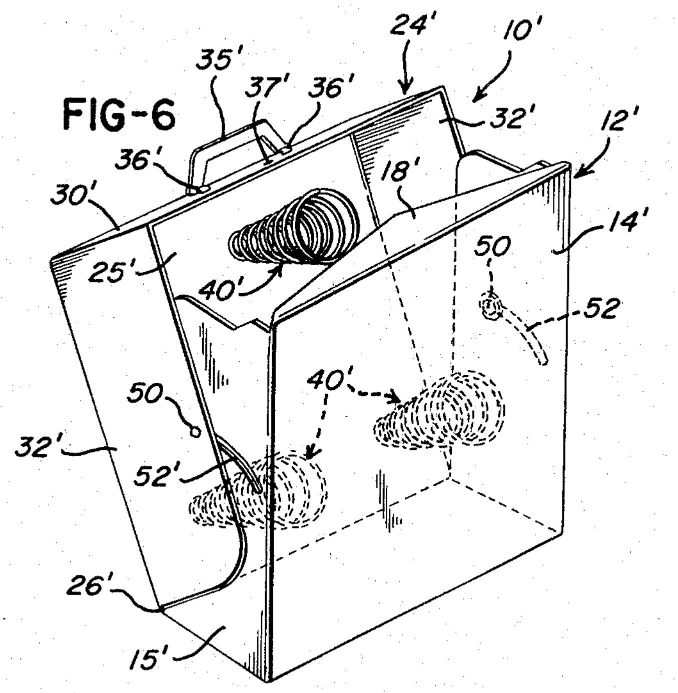
FIG. 6 is a perspective view of a modified case constructed in accordance with the invention and shown in the open position.
Figure 7:
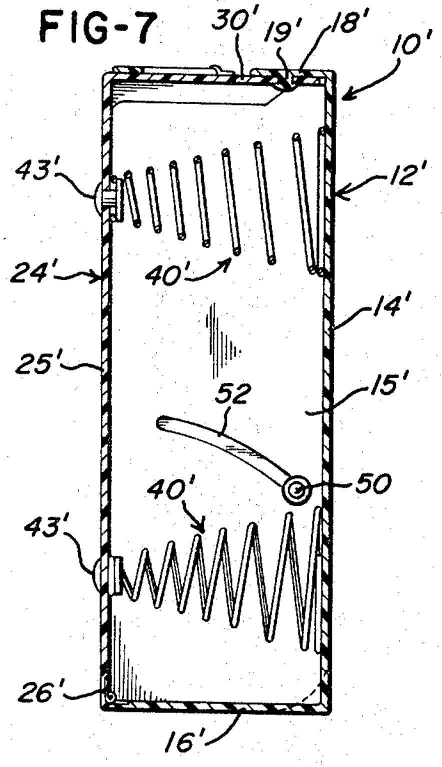
FIG. 7 is a section view similar to FIG. 2 of the modified case shown in FIG. 6 in the closed position.

A modified from of a record case constructed in accordance with the invention is shown in FIGS. 6 and 7, adapted to be opened sufficiently for convenient removal of the records, but with the opened section remaining substantially upright. Since this record case has a construction quite similar to the construction of the case shown in FIGS. 1–4, common reference numbers with prime marks have been used in FIGS. 6 and 7 to indicate the corresponding structure. One difference of the case structure shown in FIGS. 6 and 7 is that the integral end flanges 32′ of the case member 24′ are substantially larger than the flanges 31 and 32 (FIG. 1) of the case member 24 and are employed to support corresponding shouldered rivets 50 which extend through aligned arcuate slots 52 formed within the end panels 15′ of the case member 12′ to maintain case member 24′ in a relatively upright position.

In this embodiment support for the records is shown as comprising a plurality of three uniformly spaced helical-spiral or conical compression springs 40′ mounted on the side panel 25′ rather than a single substantially larger spring 40 as shown in FIGS. 2 and 3. Either the single spring form or a plurality of springs could be used in either embodiment, the important criterion being that the total spring surface bearing on the records is sufficient to effect proper distribution of pressure on them. The case 10′ is opened in the same manner as the case 10, that is, by depressing the top panel 30′ to release the stud 19′ from the hole 37′. The pivotable movement of the case member 24′ is limited, however, when the rivets 50 are stopped by the ends of the arcuate slots 52 (FIG. 2). Thus in the open position, the case 10′ does not occupy as much space as the case 10 when it is open, and does not lower the stack of vertically positioned records to a sloping position as illustrated in FIG. 3. It is necessary only that the opening between the case members be wide enough to permit convenient insertion and removal of the records.

While the case members 12′ and 24′ and the springs 40′ function in the same manner as the case members 12 and 24 and the springs 40 of the case 10 when the case 10′ is closed, that is, to retain either a few or a substantial number of records in stacked vertical relation against the side panel 14′, the construction of the case 10′ with the plurality of springs 40′ and the limited movement of the case member 24′ provides somewhat more convenient inserting, removing, and leafing through the records when the case 10′ is open. That is, in the embodiment shown in FIGS. 6 and 7, the records remain in stacked vertical relation when the case member 24′ is open as a result of the lateral force exerted against the lower portion of the records by the two lowermost springs 40′. However, when it is desired to insert or remove a record or to just leaf through the stack of records, the records may be easily moved or tilted against the bias of the lower springs 40′ to separate the top edges of the records.

From the drawings and the above description, it can be seen that a record case constructed in accordance with the invention provides a number of desirable features and advantages. The overall simplified construction of the case provides for significant economy in construction. In addition, by attaching the carrying handle 35 to the top panel 30 extending from the side panel 25 and overlapping the top panel 30 with the tab member 18, an economical detent-type latch is provided with the stud 19 and hole 37. Preferably, the stud 19 is formed with a neck portion supporting an enlarged or bulbous end portion for added security in retaining the latch closed.

The collapsible spring 40 or springs 40′ also provide important features of the invention. The conical helical type of spring produces a positive retaining force for holding the records flat regardless of the number of records contaned within the case. While other types of spring such as a U-shaped or leaf-type of spring could be used the conical form is preferred because it is capable of collapsing into a space substantially no wider than the diameter of the wire so as to accommodate a full case of records, without substantially increasing the force exerted on the records. In addition, the mounting of the spring provides for automatic release of the records when the case is opened so that the records may conveniently be removed and inserted within the corresponding jackets 46 as they are used.

The construction of the case members 12 and 24 or 12′ and 24′ also provide a rigid case which is economical to manufacture. That is, each case member is constructed so that it can be easily molded and the integral end panels 15, bottom panel 16 and tab 18 add rigidity to the side panel 14 while the top panel 30, end flanges 31 and 32 and hinge connection add rigidity to the side panel 25. Furthermore, the case of the invention provides a single complete unit and does not embody any removable pieces which can readily be forgotten, lost or mislaid. The construction of the case 10′ shown in FIGS. 6 and 7 provides the additional feature of maintaining the records in stacked vertical relationship under a spring bias when the case is opened so that individual records can be conveniently inserted and removed, which also minimizes the space required by the open case 10'.

While the record cases herein described constitute preferred embodiments of the invention, it is to be understood that the invention is not limited to these precise forms, and that changes may be made therein without departing from the scope of the invention which is defined in the appended claims.

What is claimed is:

1. An improved case for protecting, transporting and storing disk records or the like, comprising a pair of case members each having a generally flat side panel, hinge means connecting said case members for movement between a closed position with said side panels extending in generally parallel spaced relationship and an open position with said side panels extending in angular relationship, latch means for securing said case members together in said closed position, handle means connected to at least one of said case members, at least one collapsible spring having one end portion cantileveredly secured to said side panel of one of said case members and its other end portion extending towards said side panel of the other said case member, said spring operating to press the records against said other side panel when said case members are in said closed position to maintain the records in flat stacked relationship during storage and transporting the same and to displace the records angularly relative to said side panel supporting said spring during movement of said case members to said open position for providing a cushioned inclined support for the records when said case members are in said open position for conveniently removing and inserting selective records.

2. A case as defined in claim 1 wherein said spring extends substantially the entire distance between said side panels when said case members are in said closed position for retaining only a few records, and is adapted to collapse into a substantially thin space for accommodating a large number of records substantially filling the space between said side panels.

3. A case as defined in claim 1 wherein said spring comprises a conical-helical coiled wire spring having a large end and a small end and adapted to collapse into a space having a thickness substantially equal to the diameter of the wire forming said spring.

4. A case as defined in claim 3 wherein said small end of said wire spring is connected to the supporting said side panel so that said large end of said spring is positioned adjacent the records for distributing said retaining force over a substantial area.

5. A case as defined in claim 3 including a plurality of said coiled wire springs each mounted cantileveredly on the same said side panel.

6. A case as defined in claim 1 wherein one of said case members includes a bottom panel rigidly connected to the corresponding said side panel, the other said case member includes a top panel rigidly connected to the corresponding said side panel, said handle means connected to said top panel, and said hinge means connects said bottom panel to said side panel of said other case member.

7. A case as defined in claim 6 wherein said latch means includes a tab member extending from said side panel rigidly connected to said bottom panel and positioned in overlapping relationship with said top panel, and detent means connecting said tab member to said top panel and adapted to form a positive lock when said case is closed and lifted by said handle means.

8. A case as defined in claim 7 wherein said detent means include means defining an opening within said top panel, and stud means projecting downwardly from said tab member and adapted to snap into said opening when said case members are moved to said closed position.

9. A case as defined in claim 1 including a bottom panel on one of said first case members and adapted to position the corresponding said side panel in a substantially vertical position when said bottom panel is resting on a horizontal surface, said hinge means connecting said bottom panel to said side panel of the other said case member, and means connecting said case members for limiting the movement of said case members when said case is opened.

10. A case as defined defined in claim 9 wherein one of said case members includes a top panel connected to the corresponding said side panel, said handle means connected to said top panel, each said case member having a set of parallel spaced end flanges connected to the corresponding said side panel, and said end flanges of said case members disposed in interfitting and overlapping relationship when said case members are moved to said closed position.

11. A case as defined in claim 10 wherein said limiting means includes means defining at least one arcuate slot within one of said end flanges of one of said case members and means extending through said slot and connected to the adjacent said end flange of the other said case member.

References Cited

UNITED STATES PATENTS

| | | | |
|---|---|---|---|
| 516,452 | 3/1894 | Schwerdt | 312—61 |
| 1,320,958 | 11/1919 | Albrecht et al. | 312—10 |
| 2,261,806 | 11/1941 | Hills | 312—10 |
| 2,670,261 | 2/1954 | Mueller | 211—40 |
| 3,102,635 | 9/1963 | Werwin et al. | 312—13 |
| 436,052 | 9/1890 | Deming | 312—61 |

FOREIGN PATENTS

| | | |
|---|---|---|
| 155,230 | 8/1956 | Great Britain. |
| 754,125 | 4/1933 | France. |

BOBBY R. GAY, *Primary Examiner.*

J. L. KOHNEN, *Assistant Examiner.*